United States Patent
Kennedy

(10) Patent No.: US 6,812,582 B2
(45) Date of Patent: Nov. 2, 2004

(54) INTEGRATED SEMI-TRUCK AIR CONDITIONING SYSTEM WITH AUXILIARY POWER SOURCE

(76) Inventor: Gino W. Kennedy, 1743 Holly Oake Lake Rd. West, Jacksonville, FL (US) 32225

(*) Notice: Subject to any disclaimer, the term of this patent is extended or adjusted under 35 U.S.C. 154(b) by 81 days.

(21) Appl. No.: 10/047,659

(22) Filed: Jan. 15, 2002

(65) Prior Publication Data

US 2002/0056993 A1 May 16, 2002

Related U.S. Application Data

(63) Continuation-in-part of application No. 09/945,186, filed on Aug. 31, 2001, which is a continuation-in-part of application No. 09/603,725, filed on Jun. 23, 2000.

(51) Int. Cl.$^7$ .............................................. H02P 9/04
(52) U.S. Cl. ....................................... 290/1 A; 290/1 B
(58) Field of Search ................................. 290/1 A, 1 R, 290/1 B; 165/43; 296/37.6, 37.8, 37.14, 39.2; 280/164.1

(56) References Cited

U.S. PATENT DOCUMENTS

| | | | | |
|---|---|---|---|---|
| 2,662,988 A | | 7/1953 | McKim ......................... 310/91 |
| 3,844,130 A | * | 10/1974 | Wahnish ....................... 62/133 |
| 4,010,378 A | * | 3/1977 | Tharpe et al. .................. 290/2 |
| 4,441,684 A | | 4/1984 | Credle, Jr. .................... 248/674 |
| 4,531,379 A | * | 7/1985 | Diefenthaler, Jr. ............ 62/236 |
| 4,709,751 A | * | 12/1987 | Ichimaru et al. ............. 165/204 |
| 4,756,359 A | * | 7/1988 | Greer .......................... 165/43 |
| 4,762,170 A | | 8/1988 | Nijjar et al. ................... 165/43 |
| 5,333,678 A | * | 8/1994 | Mellum et al. ............... 165/42 |
| 5,765,805 A | * | 6/1998 | Kennedy ..................... 248/674 |
| 5,954,120 A | * | 9/1999 | Aoki et al. ................... 165/43 |
| 6,047,942 A | | 4/2000 | Kennedy ..................... 248/674 |
| 6,530,426 B1 | * | 3/2003 | Kishita et al. .............. 165/202 |

FOREIGN PATENT DOCUMENTS

JP         411148348 A * 6/1999

* cited by examiner

Primary Examiner—Joseph Waks
Assistant Examiner—Julio C. Gonzalez
(74) Attorney, Agent, or Firm—McHale & Slavin, P.A.

(57) ABSTRACT

An integrated conventional air conditioning system for use in trucks having an auxiliary power source to drive the compressor when the main engine is not operating. The compressor has a single shaft with a clutch engagable pulley coupled thereto and a belt-driven pulley mounted pulley thereon. The clutch engagable pulley is rotatable by the main engine and the pulley is operable to drive the shaft independently of the clutch engagable pulley when the main engine is not operating. An electric motor is mounted to and mechanically linked to the air conditioner compressor. The electric motor has a second clutch engagable pulley operatively coupled thereto wherein the second clutch engagable pulley is rotatable when the electric motor is operating. The second clutch engagable pulley is coupled to the belt-driven pulley mounted on the shaft. A means for is provided for selectively and independently engaging the first clutch engagable pulley and the second clutch engagable pulley for operation of the air conditioner compressor. An auxiliary power plant provides power to the he electric motor.

9 Claims, 6 Drawing Sheets

INTEGRATED SEMI-TRUCK AIR CONDITIONING SYSTEM WITH AUXILIARY POWER SOURCE

RELATED APPLICATIONS

This invention is a continuation-in-part of application Ser. No. 09/945,186 filed filed Aug. 31, 2001, which is a continuation-in-part of application Ser. No. 09/603,725 filed Jun. 23, 2000 the contents of which are incorporated herein by reference.

FIELD OF THE INVENTION

This invention relates generally to semi-truck air conditioning systems, and more particularly to an integrated air conditioning system which is selectively operable by either the main engine or an auxiliary power plant which can drive the compressor when the primary engine is not operating.

BACKGROUND OF THE INVENTION

Semi-truck tractor trailers frequently employ the use of an auxiliary generator to meet electrical requirements when the main engine is not running. Tractor trailers having a "bunk" or "sleeper" cab area are common and most interstate fuel stations permit the drivers of such vehicles to sleep in their cab. The passenger area of the truck may include convenience items such as a television, VCR, refrigerator, air conditioner, coffee maker, even a microwave oven. While such items may run on direct current provided by an engine mounted alternator, or even alternating current by use of an inverter, the truck engine must be running. Idling laws now prohibit the running of the main engine for prolong periods of time. However, the time and cost savings of keeping the driver near the vehicle while at rest are obvious and ancillary benefits include security as the operator does not leave the vehicle unattended. A problem with the use of auxiliary generators is directed to size, weight, and placement. The size of an auxiliary generator is critical for if the overall dimensions are too large, there will be insufficient areas on a truck for which to place the auxiliary generator. For instance, it is not practical to place an auxiliary engine within the existing main engine compartment. Placement of an auxiliary engine on the frame rails is a known alternative, however conventional auxiliary generators employ baseplates making the size, weight, and subsequent placement a problem.

The use of gasoline engines to power a generator is also well known. Gasoline engines are lighter in weight and smaller in size when compared to a diesel engine of the same horsepower. However, gasoline is a very volatile fuel and when a gasoline engine is placed into the confines of a container or step box, the gasoline engine must be made either "spark proof" or it will present a lethal environment that can create an explosion. Further, when used on a diesel powered tractor trailer, a separate fuel tank is required and grounding becomes critical since any stray spark can ignite gasoline. An example of a system using a gasoline engine is seen in U.S. Pat. No. 3,844,130 which discloses an auxiliary power system for a automobile air conditioner which utilizes an electrical generator and gasoline engine located in the trunk of the automobile.

The Applicant is a well known assembler of diesel engine/generators packages and has been awarded patents for various arrangements. U.S. Pat. Nos. 6,047,942 and 5,765,805 to the Applicant disclose the use of a combination engine/generator that is lightweight and of a novel space saving configuration. The contents of U.S. Pat. Nos. 6,047,942 and 5,765,805 are incorporated herein by reference.

The prior art discloses numerous systems by which air conditioning and heating can be provided in a motor vehicle while the engine is not running. Some systems, such as that disclosed in U.S. Pat. Nos. 4,756,359, and 4,762,170, utilize separate and wholly independent auxiliary air conditioning systems which are powered by auxiliary power plants. In terms of economy of both expense and space, it would be far more desirable to provide a system which utilizes the existing standard air conditioning system of a vehicle instead of providing dual systems. An example of this can be seen in Diefenthaler, Jr., U.S. Pat. No. 4,531,379, which teaches use of a auxiliary engine located in the engine compartment which serves to drive the air conditioner compressor when the main engine is not running. A clear disadvantage of the Diefenthaler, Jr. system is the inherent difficulty of placing a second engine in the engine compartment due to space considerations. Also, the Diefenthaler, Jr. system would not be suitable for a "retrofit" installation.

Thus, what is needed is a means to drive the existing, standard air conditioning system in a semi-truck without the main engine running which makes an economical use of space can be readily integrated into the air conditioning system.

SUMMARY OF THE INVENTION

Accordingly, it is an objective of the instant invention to provide an integrated air conditioning system which is selectively operable by either the main engine or an auxiliary power plant which can drive the compressor when the primary engine is not operating.

It is another objective of the invention to provide an integrated vehicle air conditioning system which utilizes an electric motor coupled to the drive shaft of the compressor of the existing air conditioning system in order to operate the air conditioning system when the main engine is not running.

It is a further objective of the invention to provide an integrated vehicle air conditioning system which includes an auxiliary power plant to drive the electric motor.

It is yet another objective of the invention to provide an integrated vehicle air conditioning system to retro-fit on existing vehicles.

In accordance with the above objectives, an integrated conventional air conditioning system for use in trucks which is selectively operable by the main engine or an auxiliary power plant is provided. The integrated conventional air conditioning system consists of an air conditioner compressor having a single shaft with a clutch engagable pulley coupled thereto and a belt-driven pulley mounted thereon. The clutch engagable pulley is rotatable by the main engine and the pulley is operable to drive the shaft independently of the clutch engagable pulley when the main engine is not operating.

An electric motor is mounted to and mechanically linked to the air conditioner compressor. The electric motor has a second clutch engagable pulley operatively coupled thereto wherein the second clutch engagable pulley is rotatable when the electric motor is operating. The second clutch engagable pulley is coupled to the belt-driven pulley mounted on the shaft. A means is provided for selectively and independently engaging the first clutch engagable pulley and the second clutch engagable pulley for operation of the air conditioner compressor, whereby the conventional air conditioning system introduces cool air through the truck mounted air conditioning ducts while the main engine is operating or when the auxiliary power source is employed. An auxiliary power plant provides power to the he electric motor.

The auxiliary power plant includes a horizontally disposed one cylinder liquid cooled Kubota diesel engine integrally coupled with a low profile auxiliary generator. The generator is preferably an alternating current generator. The auxiliary power plant provides about 3.5 kilowatts. The auxiliary power plant is fixedly placed within an enclosure having an interconnected floor, opposite vertical side walls, opposite vertical end walls, and a top parallel to the floor. The Kubota diesel engine is rigidly connected to the electrical generator by a thin vertical planar bracket. The engine has at least one cylinder disposed parallel to the floor for turning the generator to produce electricity. To reduce vibration, the auxiliary power plant is connected to isolation mounts which are fixed to the floor of the enclosure. The height of the vertical end walls and the vertical side walls of the enclosure is approximately 15 inches.

The liquid cooled engine has a remotely mounted radiator and associated fan. The radiator is located between the perforated wall and the associated fan whereby the fan extracts heat from the enclosure and provides air flow across the radiator.

The integrated conventional air conditioning system is used with an auxiliary power source wherein the means for selectively and independently engaging the first clutch and second clutches includes a relay means for preventing simultaneous operation.

DETAILED DESCRIPTION OF THE INVENTION

The present invention is an integrated conventional air conditioning system which is selectively operable by either the main engine or an auxiliary power plant which can drive the compressor when the primary engine is not operating.

Figure 1:
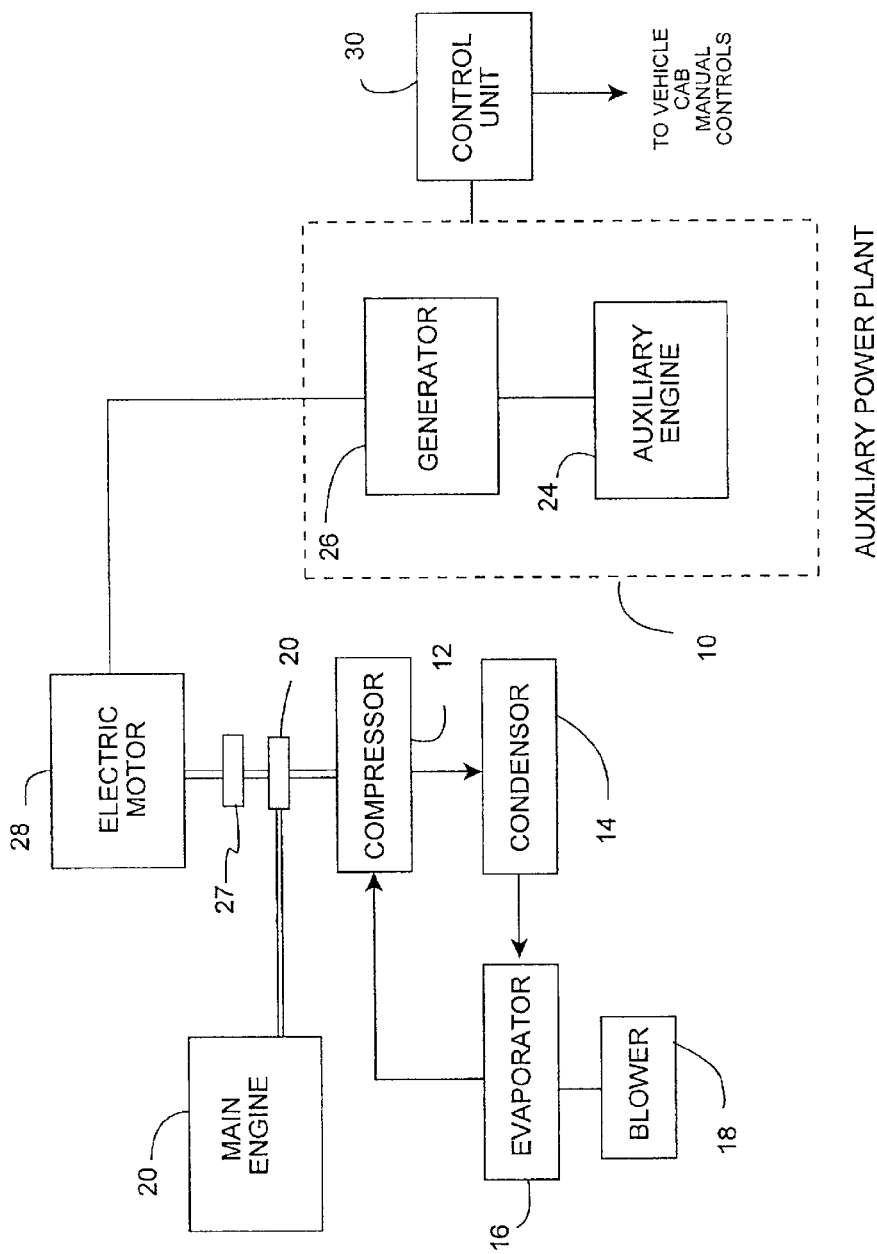
FIG. 1 is a schematic illustration of an integrated air conditioning system for a semi-truck air conditioning system having an auxiliary power plant according to a preferred embodiment of the invention.

FIG. 1 schematically illustrates the elements of an integrated conventional air conditioning system in an semi-truck which utilizes an auxiliary power system As is known in the art, the vehicle has an main engine 20, and an air conditioning system including a compressor 12 for compressing a suitable refrigerant, a condenser 14, an evaporator 16 and a blower 18. A mechanical linkage links the compressor 12 and the engine 20 which includes an electromagnetic clutch 20 having a pulley for driving the compressor 12. An auxiliary power plant 10 provides auxiliary power to operate the air conditioning system when the main engine is not running.

Figure 2:
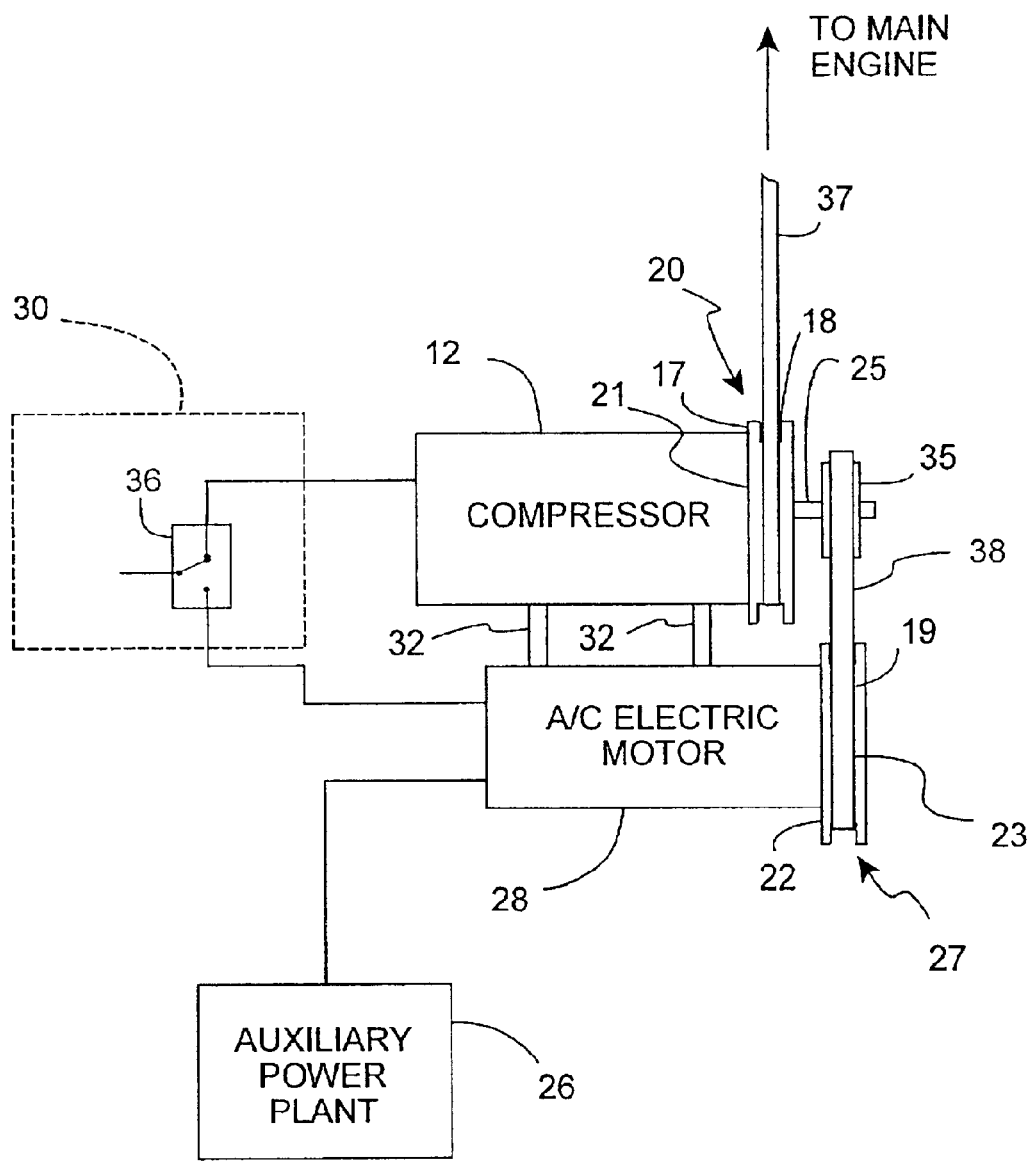
FIG. 2 illustrates the installation configuration of the compressor and the electric motor according to a preferred embodiment of the invention.

FIG. 2 schematically illustrates a preferred embodiment of the invention in which an electric motor 28 is fixedly attached and mechanically linked to the compressor 12. The electric motor 28 is operable to drive the compressor 12 when the main diesel engine of the truck is not running. In the preferred embodiment, the electric motor is a 2 horsepower single phase electric motor. As is known in the art, the electromagnetic clutch 20 has a rotor 17 rotatable on the shaft of the compressor 12, and a first clutch engagable pulley 21 fixed to the rotor. The first clutch engagable pulley 21 is kinematically connected to the crankshaft of the main engine 20 by the belt 37. The compressor 12 is a conventional compressor except for a modification of the drive shaft. In the practice of the invention shown in the illustrated embodiment, the drive shaft 25 of the compressor is extended outwardly, and a pulley 35 is mounted thereon coaxially with the first clutch engagable pulley 21. The pulley 35 is mechanically linked to a second, electric motor-driven electromagnetic clutch 27 which is directly coupled to the drive shaft of electric motor 28. The electric motor-driven electromagnetic clutch 27 includes a rotor 22 and a second clutch engagable pulley 23 which drives a belt 38, thereby engaging pulley 35 to impart rotation motion to the drive shaft 25.

A control unit 30 includes a switch 36 which is operable to alternatively selectively energize either the first clutch engagable pulley 21 or the second clutch engagable pulley 23. The control unit 30 includes a relay means 36 which prevents simultaneous operation of the first and second clutch engagable pulleys 21 and 23. The electric motor-driven clutch 27 can be a centrifugal clutch if the electric motor 28 is only engaged when needed and is stopped otherwise. The ratio of pulley 35 to pulley 19 is preferably 3:4, which results in approximately 825 RPM for the drive shaft 25, which is the required RPM for optimum operation of the compressor 12.

The compressor 12 can be selectively driven by either the electric motor 28 or the main engine 20. A control unit 30 includes therein circuit means for the operation of the auxiliary power system 10, and is coupled to manually operable controls in the vehicle cab, including the on/off switch and a thermostat.

Referring again to FIG. 1, it is seen that the vehicle includes an auxiliary power plant 10 which powers the electric motor 28. The a/c electric motor 28 is electrically coupled to the auxiliary power plant 10 with the electric motor 28 being adapted to operate with the current supplied by the auxiliary power plant 10. The auxiliary power plant 10 can include an auxiliary engine 24 which shares the same fuel supply with the main engine 20. The auxiliary engine 24 is a conventional diesel engine such as that sold under Kubota models Z482-E, D662-E, and D722-E. The auxiliary engine's crank shaft drives an electrical generator 26. The generator 26 can be any commercially available alternating current generator. The generator 26 is coupled directly to the side of the auxiliary engine 24 in the manner described in Applicant's U.S. Pat. Nos. 6,047,942 and 5,765,805. The AC output can also be coupled to one or more outlets in the cab 41 so that standard a/c electronic devices can be used inside the cab 41.

When the main engine 20 is not running, the auxiliary engine can be engaged to drive the compressor 12 in the manner set forth in the foregoing description. The operation of the second electromagnetic clutch 23 mirrors the operation of the first electromagnetic clutch 21. The integrated air conditioning system powered by the auxiliary power plant thus operates in a manner identical to operation by the main engine. The vehicle air conditioning system in the present invention is conventional and well known in the art, and the operation of the air conditioning system itself is therefore not addressed herein in detail.

In another embodiment, the electrical motor can be a direct current device. This embodiment would be suitable for use in a 42 volt hybrid electrical system. In this embodiment, the auxiliary power plant would serve to recharge the 42-volt battery array in the vehicle while the air conditioning system operates.

The electric motor 28 can be secured to the compressor 12 by any suitable rigid attachment means. In FIG. 2, the attachment means is illustrated as the brackets 32. The system of the present invention can installed in an existing truck in a retro-fit installation configuration. The system can also be fully integrated into a vehicle at the time the vehicle is manufactured. In the instance, a very large bracket can be provided which holds both the electric motor 28 and the compressor 12.

Figure 3:
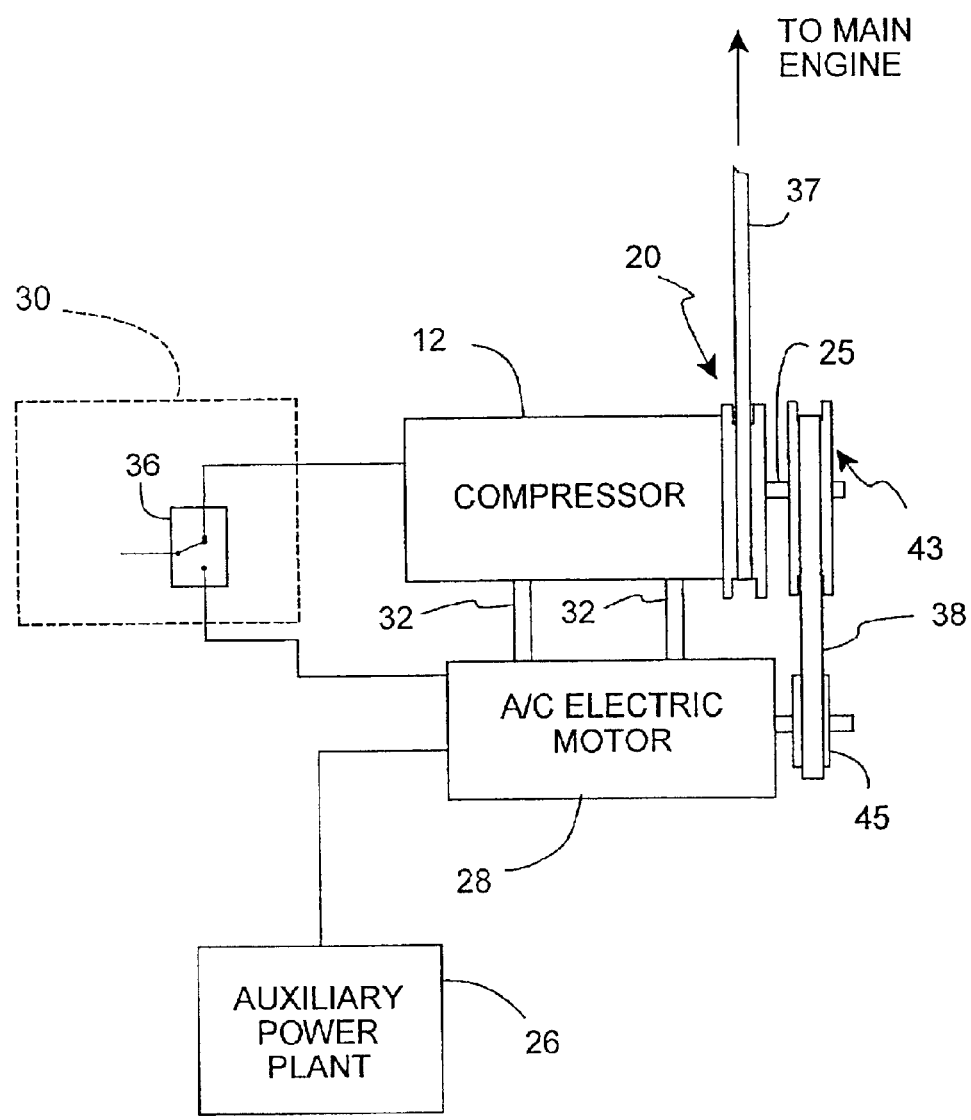
FIG. 3 is an alternative embodiment of the configuration illustrated in FIG. 2.

In FIG. 3, an alternative embodiment is illustrated in which a second clutch 43 is mounted directly on the compressor shaft 25 coaxially with the first clutch 20. The compressor 12 is driven by a pulley 45 rotatably mounted on by the electric motor 28. This embodiment is essentially the reverse of the previous embodiment with regard to the placement of the second clutch 43 and the pulley 35, and the remaining operative elements largely identical to that of the previous embodiment.

In addition to the arrangement shown in FIGS. 2 and 3, the invention contemplates any number of arrangements by which the electric motor 28 can drive the compressor 12. In still another alternative arrangement, the second clutch can be eliminated and the electric motor can drive the compressor directly with a belt drive.

Figure 4:
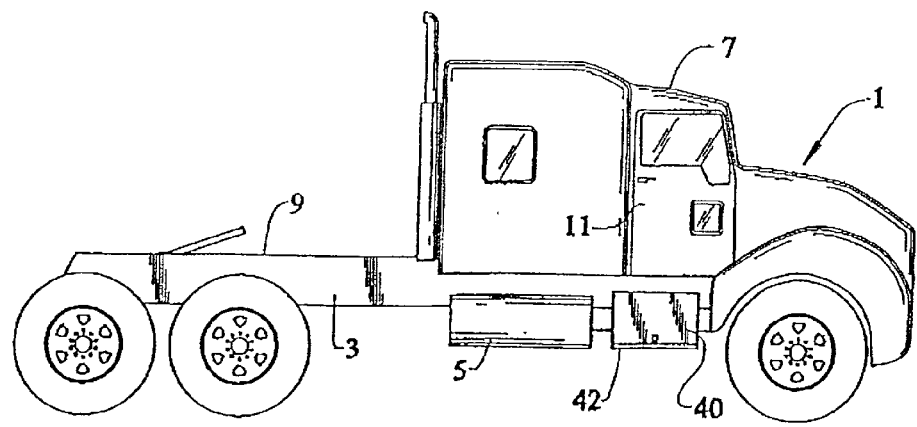
FIG. 4 is a perspective view of the auxiliary power plant installed on a large truck.

By driving the compressor with a relatively small electric motor which is proximate the compressor in the engine compartment, the invention advantageously allows the auxiliary power plant to be installed anywhere on the vehicle. In a preferred embodiment, the auxiliary power plant of the instant invention is incorporated into the step structure. FIG. 4 shows an illustration of a large truck 1 having a chassis, or frame, in which an external fuel tank 5 is typically mounted between the cab 7 and the truck bed 9 or trailer, not shown. The size and height of the truck normally requires steps located beneath the door 11 to gain entry to the cab 7. In some truck designs, the steps are faired into the external fuel tanks for aesthetics and aerodynamics. In other designs the tanks are behind the doors of the cab and the steps are separate.

The auxiliary power plant of the instant invention is incorporated within a box 40 or step structure of the truck. The step structure 40 is made of metal attached to the truck frame 3 and extends below the frame. The step structure has a lower step 42, extending horizontally closest to the ground, with a non-slip surface 44 extending between side walls 46 and 48 at each end of the step. The side walls form an integral portion of the storage box 40 which is attached to the truck frame by bolts, welding, rivets, and the like. The step 42 may be attached to the brackets in the same manner or made from a single piece of metal further forming a platform for mounting of the auxiliary power plant within the storage box. The step 44 may be a solid planar metal sheet with a non-slip tread formed in the upper surface or an open mesh material. The step 42 extends outwardly from the enclosure sufficiently to provide a safe footing.

A vertical cover 50 is rotatably attached to the brackets by a hinge 52 at the upper edge. The cover forms the front wall of the enclosure. The lower edge 54 of the cover 50 may have a latch mechanism 56 to cooperate with the step 42 to releasably hold the cover 50 in place in the closed position. When closed, the cover forms the vertical riser between the lower step and the upper step. The height of the vertical riser is limited to the distance an average person can step, e.g. approximately 14 to 17 inches. The hinged cover 50 provides access to the generator set while providing protection for both the machinery and the operators. The upper surface 58 of the cover 50 may form a second step if necessary to provide egress into the cab 11. Another fixed vertical cover opposite the front wall forms the back wall 51 of the enclosure. The wall 51 has perforations 53 for ventilation. In one embodiment (not shown), a hinge may be at the lower edge of the side wall and the latch near the upper step. Alternatively, the top may be removable such as those found on Peterbilt trucks. In a preferred embodiment, the planar horizontal surface 58 of the enclosure is attached to the side walls 60 and 62 to form the upper step. Kenworth trucks typically include a hinged cover for storage boxes.

Figure 5:
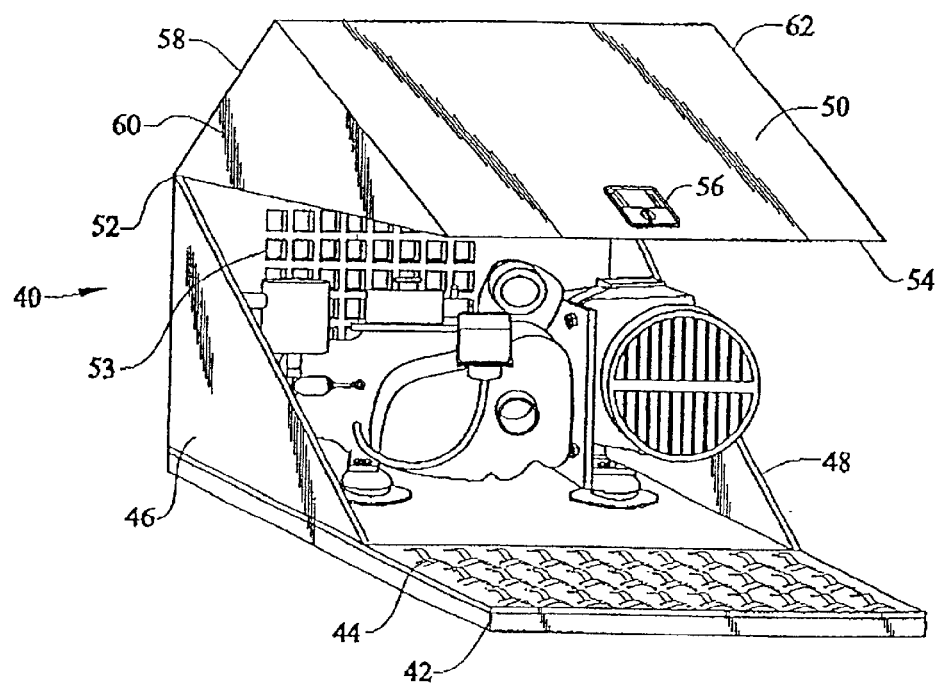
FIG. 5 is a perspective of the diesel engine/generator set.

Now referring to FIG. 5, there is shown a conventional diesel engine 100, such as manufactured by the Kubota Corporation, having a horizontally disposed cylinder 112 and an integral generator 142 located on opposite sides of the crank case 116. This orientation is necessary to accommodate the internal space requirements existing in the step 42. In this installation, the piston reciprocates parallel to the step surface 44.

Figure 6:
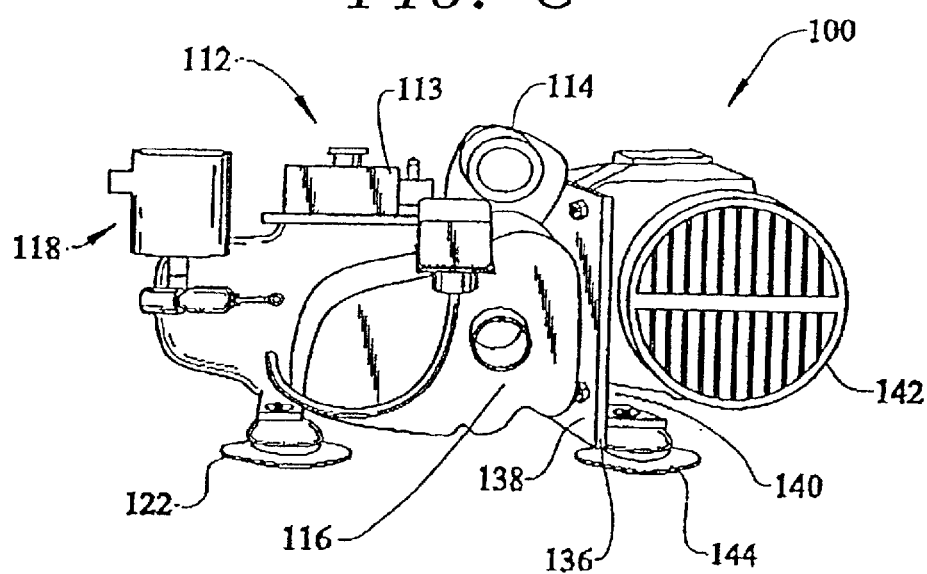
FIG. 6 is a perspective of the mount of FIG. 1 with the auxiliary power plant exposed.

The engine, shown in FIG. 6, is self contained having a radiator 113, starter 114, crank case 116, air cleaner 118, and fuel injections system 120. The crank case 116 includes isolation mounts 122 mounted to the crank case by the use of support brackets.

A support bracket 136 is constructed from an aluminum plate having a thickness of about ⅜ inch with a first side surface 138 securable to the engine and a second side surface 140 available for securing the generator 142. The bracket 136 may be through-bolted to the engine and generator or otherwise fixed to provide a rigid engine/generator set. A second set of isolation mounts 144 is secured to the bracket 136 providing a structure for mounting inside the storage box 40.

Figure 7:
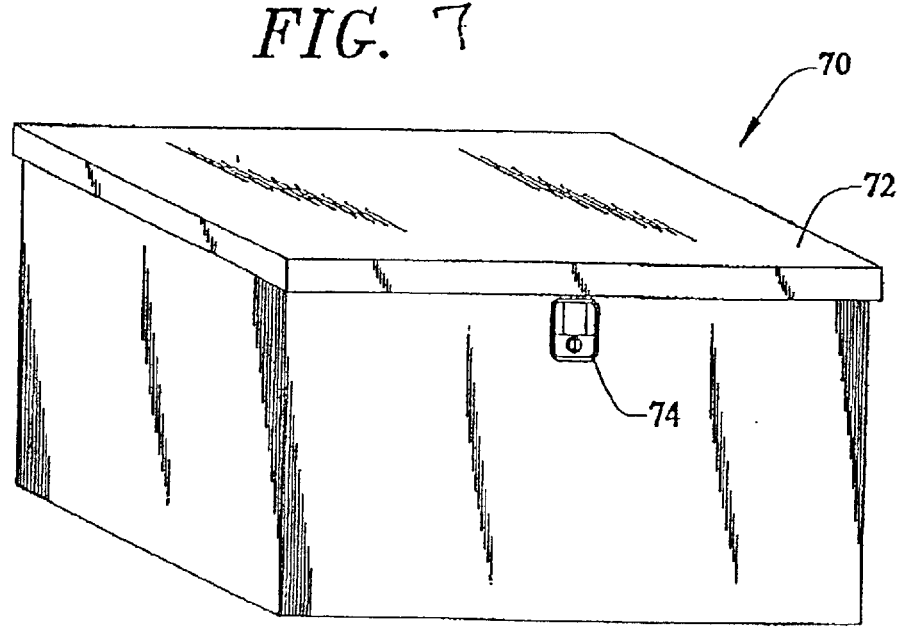
FIG. 7 is another embodiment of the low profile auxiliary power plant mount.
Figure 8:
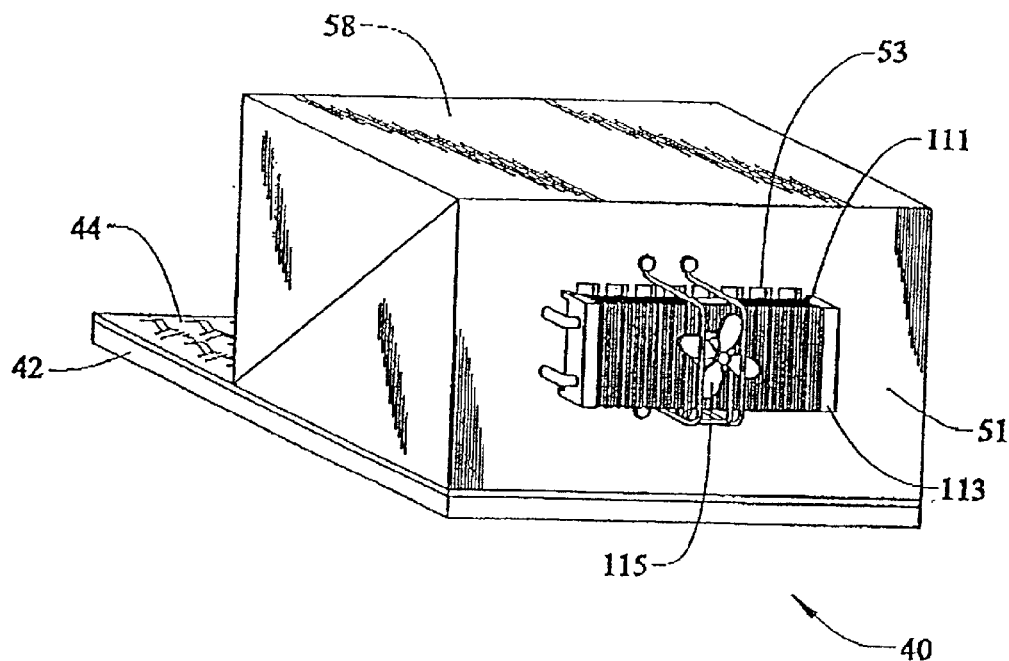
FIG. 8 is a prospective of the rear of the truck step.

The low profile auxiliary power plant has the approximate dimensions of 28 inches length, 17 inches height and 16 inches deep. The preferred engine 100 is a one cylinder liquid cooled Kubota diesel engine turning a generator of 3.5 kilowatts capacity at 120 volts and 30 amps. In another embodiment having a height approximately 14 inches, the engine radiator 113 and cooling fan 115 are located outside the enclosure and connected to the engine by the requisite hoses and wires, as shown in FIGS. 7 and 8. The radiator is secured to the enclosure wall by the use of isolation supports or rubber biscuits 111. The rubber biscuits 111 space the radiator apart from the enclosure a predetermined distance creating a relief space. The fan 115 is positioned outboard the radiator wherein the fan draws air from the relief space and through the radiator 113. In addition, the enclosure preferably includes a discharge opening or perforated back wall 51 wherein the fan draws air from the enclosure with the relief space providing additional air if the enclosure lacks sufficient air displacement. In this position, the fan serves the dual purpose of extracting heated air from the enclosure and providing air flow across the radiator. Alternatively, the auxiliary power plant can access the primary cooling system of the truck. In this arrangement, the radiator and fan can be removed and fluid circulated through the truck radiator system wherein by its shear volume may not require an auxiliary fan for cooling of the smaller engine coupled to the generator.

Figure 9:
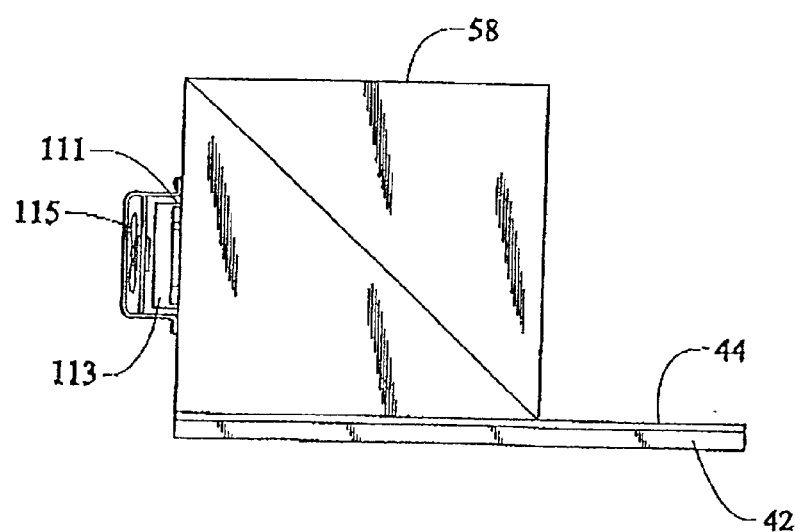
FIG. 9 is a side view of the truck step.

FIG. 9 sets forth another embodiment wherein the auxiliary power plant may be mounted in a box 70 having a hinged top 72. The box 70 would appear that of a conventional storage box found on trucks and may, or may not, operate as a step. The top 72 may be opened to gain access to the generator set rotating along a hinge and secured closed by a latch mechanism 74 to releasably connect the top step to the remainder of the box. In both embodiments of the enclosure, there is adequate ventilation to permit dissipation of heat and engine air intake.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. An integrated truck mounted air conditioning system having an auxiliary power source for use in trucks powered by a main internal combustion diesel engine, comprising:

an air conditioner compressor having a single input shaft including a first pulley and a second pulley coupled thereto, said first pulley being clutch engagable and constructed and arranged to engage a first flexible continuous belt driven by said main engine for providing rotation to said compressor, said second pulley constructed and arranged to engage a second flexible continuous belt driven by an electric motor for providing rotation to said compressor;

an electric motor mounted to said main engine having a second clutch engagable pulley operatively coupled to an output shaft thereof, wherein said second clutch engagable pulley is constructed and arranged to engage said second belt for selectively rotating said compressor;

means for selectively and independently engaging said first clutch engagable pulley and said second clutch engagable pulley for operation of said air conditioner compressor;

an auxiliary power source for providing electrical power for operation of said electric motor, wherein said auxiliary power source is a low profile auxiliary tower plant placed within an enclosure having an interconnected floor, opposite vertical side walls, opposite vertical end walls, and a top parallel to said floor, said auxiliary power plant including an integral engine/generator set fixed in said enclosure, said engine/generator set having a liquid cooled internal combustion diesel engine rigidly connected to an electrical generator for turning said generator to produce electricity, wherein said generator delivers electric current to said electric motor;

whereby said truck mounted air conditioning system introduces cool air through the truck mounted air conditioning ducts while the main engine is operating or when said auxiliary power source and said electric motor is employed.

2. The integrated truck mounted air conditioning system for use with an auxiliary power source according to claim 1 wherein the height of said vertical end walls and said vertical side walls is approximately 15 inches.

3. The integrated truck mounted air conditioning system for use with an auxiliary power source according to claim 1 wherein said liquid cooled engine has a radiator and associated fan, said radiator and said fan remotely mounted.

4. The integrated truck mounted air conditioning system for use with an auxiliary power source according to claim 1 including a radiator located between a perforated wall and said associated fan whereby said fan extracts heat from said enclosure and provides air flow across said radiator.

5. The integrated truck mounted air conditioning system for use with an auxiliary power source according to claim 1 wherein said first clutch engagable pulley is rotatable by said engine mounted pulley by use of a flexible belt.

6. The integrated truck mounted air conditioning system for use with an auxiliary power source according to claim 1 wherein said second clutch engagable pulley is rotatable by said electric motor mounted pulley by use of a flexible belt.

7. The integrated truck mounted air conditioning system for use with an auxiliary power source according to claim 1 wherein said means for selectively and independently engaging said first clutch engagable pulley and second clutch engagable pulleys includes a relay means for preventing simultaneous operation of said first and second clutch.

8. The integrated truck mounted air conditioning system for use with an auxiliary power source according to claim 1 wherein said generator in said auxiliary power plant is an alternating current generator.

9. The integrated truck mounted air conditioning system for use with an auxiliary power source according to claim 1 including a rigid electric motor mounting plate having a first portion constructed and arranged to couple said plate to said air conditioning compressor and a second portion constructed and arranged to couple said electric motor to said plate.

* * * * *